United States Patent [19]

Hayashi

[11] Patent Number: 5,178,909
[45] Date of Patent: Jan. 12, 1993

[54] PRODUCTION OF SILVER-COATED COPPER-BASED POWDERS

[75] Inventor: Takao Hayashi, Shimonoseki, Japan

[73] Assignee: Mitsui Kinzoku Kogyo Kabushiki Kaisha, Tokyo, Japan

[21] Appl. No.: 731,313

[22] Filed: Jul. 17, 1991

[30] Foreign Application Priority Data

Jul. 24, 1990 [JP] Japan .................. 2-195537

[51] Int. Cl.$^5$ .............................. B05D 7/24
[52] U.S. Cl. .................. 427/216; 427/125; 427/217; 427/343
[58] Field of Search ........... 427/125, 216, 217, 304, 427/328, 343; 252/514; 106/1.19

[56] References Cited

U.S. PATENT DOCUMENTS 4,652,465  3/1987  Koto et al. .................. 427/216

FOREIGN PATENT DOCUMENTS 61-3802   1/1986  Japan .................. 427/216
1-119602  5/1989  Japan .................. 427/216

Primary Examiner—Michael Lusignan
Assistant Examiner—Terry J. Owens
Attorney, Agent, or Firm—Wenderoth, Lind & Ponack

[57] ABSTRACT

Silver-coated copper-based powders are prepared by the steps of dispersing copper powders in a chelating agent solution, adding a silver ion solution to the resulting dispersion to effect a substitution type of deposition reaction and, then, adding a reducing agent to the resulting solution to effect a reduction type of deposition reaction, thereby forming silver coats on the surfaces of the copper powders, wherein the chelating agent solution is prepared in two portions, a first portion thereof being prepared before the addition of the silver ion solution and a second portion thereof being added during the addition of the reducing agent, or in three portions, a first portion thereof being prepared before the addition of the silver ion solution, a second portion thereof being added during the addition of the reducing agent and a third portion thereof being added at the time of the completion of the reaction.

10 Claims, 1 Drawing Sheet

PRODUCTION OF SILVER-COATED COPPER-BASED POWDERS

TECHNICAL FIELD

The present invention relates to producing silver-coated copper-based powders. More particularly, this invention concerns the inexpensive preparation of silver-coated copper-based powders so excellent in electrical conductivity, oxidation resistance and humidity resistance that they can be used as electrically conductive fillers for a low-temperature curing type of electrically conductive paste and other materials.

BACKGROUND ART

Hitherto, there have been available electrically conductive paste products in which electrically conductive metal powders composed mainly of copper powders are incorporated in organic resins such as phenolic resins, etc. This paste, because of being capable of being heat-treated at a temperature of 300° C. or lower, has been widely used for forming through-holes in printed circuit boards or as electrodes thereon.

Use of silver as an electrically conductive filler gives coats excellent in electrical conductivity and oxidation resistance, but silver is expensive and in short supply. On the other hand, copper powders, are available at low and stable prices, have an initial electrical conductivity equivalent to silver, but they copper powders are so susceptible to oxidation that a problem can arise in connection with the quality and stability of the copper powders.

Silver-coated copper-based powders have been proposed as electrically conductive filers which make up for the defect of copper powders and are virtually equivalent in terms of electrical conductivity and oxidation resistance to silver. In general, such silver-coated copper-based powders may be prepared by an electroless type of substitution plating making use of the substitution reaction between copper and silver or a reduction type of electroless plating taking advantage of the silver mirror reaction of formalin. For instance, it has been proposed to substitute the surfaces of metallic copper powders by silver using a silver complex salt solution consisting of silver nitrate, ammonium carbonate and a trisodium salt of ethylenediaminetetraacetic acid and thereby precipitate silver on them (as disclosed in Japanese Patent Publication No. Sho. 57-59283), or to coat metallic copper powders with silver using a silver complex salt solution consisting of silver nitrate, aqueous ammoniaa and a sodium salt of ethylenediaminetetraacetic acid (as set forth in Japanese Patent Kokai Publication No. Sho. 61-3802).

However, the conventional silver coating on the copper powders' surfaces by substitution and precipitation fails to achieve a complete coating of silver. Moreover, although the silver coats excel in their initial electrical conductivity, their properties, especially oxidation resistance, deteriorate with time due to impurities, like $SO_4$ and Na ions, which result from the processes of degreasing the starting copper powders and removing oxides and unstable by-products generated during substitution and precipitation, such as $Cu(OH)_2$ and $Cu_2O$. Use of a silver cyanide bath poses problems in connection with safety and waste water disposal, because it is a deadly poison.

Having been accomplished with the foregoing in mind, this invention has for its object to provide a method for producing silver-coated copper-based powders inexpensively, which excel in humidity resistance and oxidation resistance, show stable properties with no change with time, and is improved in terms of electrical conductivity.

DISCLOSURE OF THE INVENTION

According to this invention, the above-mentioned object in achieved by the provision of a method of producing silver-coated copper-based powders by dispersing copper powders in a chelating agent solution, adding a silver ion solution to the dispersion to effect a substitution type of deposition reaction and, then, adding a reducing agent to the resulting solution to effect a reduction type of deposition reaction, thereby forming silver coats on the surfaces of said copper powders, wherein said chelating agent solution is added in two portions, a first portion thereof being added before the addition of said silver ion solution and a second portion thereof being added during the addition of said reducing agent, or in three portions, a first portion thereof being added before the addition of said silver ion solution, a second portion thereof being added during the addition of said reducing agent and a third portion thereof being added at the time of the completion of the reaction.

In this invention, the chelating agent solution may range from a weakly alkaline to weakly acidic state.

DETAILED DESCRIPTION OF THE INVENTION

Figure 1:
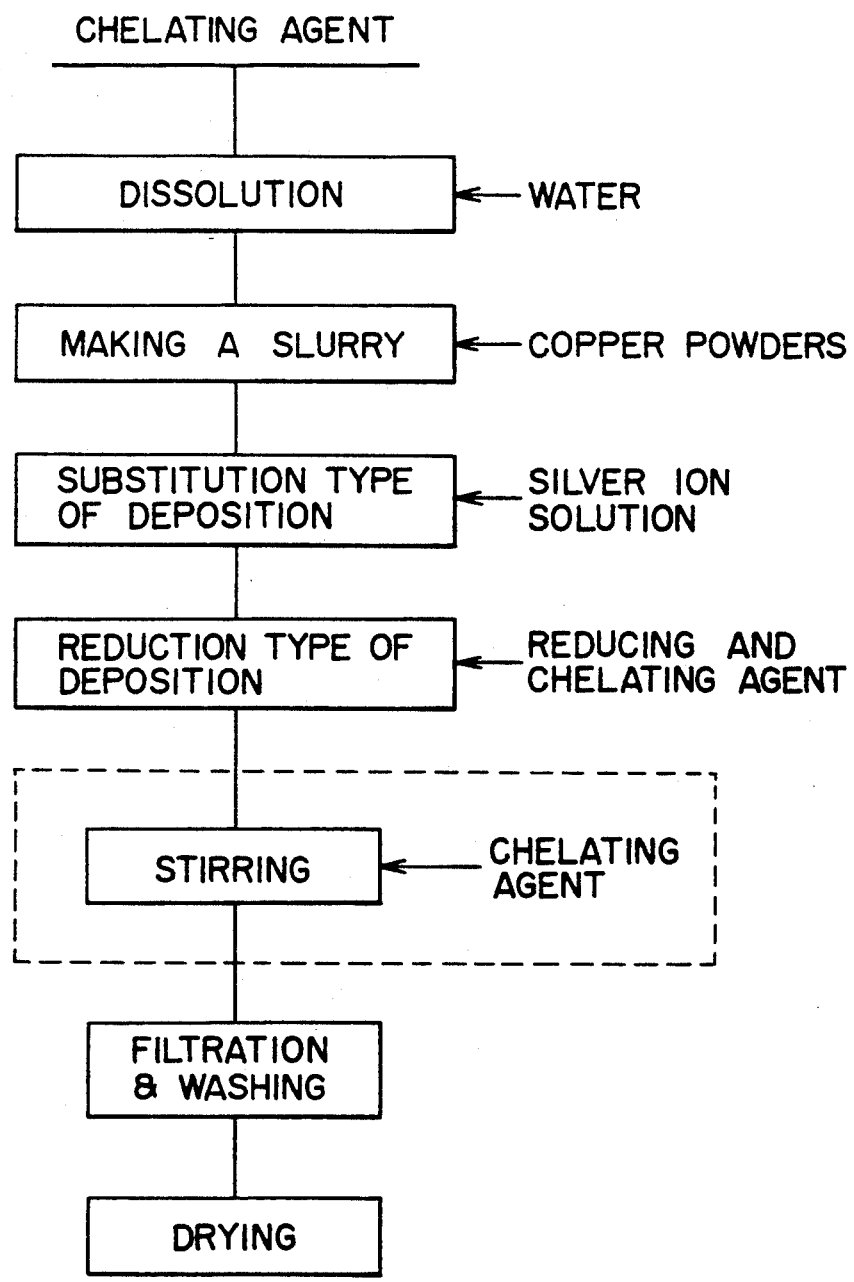
FIG. 1 is a flow chart showing the steps of the method according to this invention.

In the description that follows, the present invention will now be explained in greater detail.

Copper Powders

The copper powders, which may be used in this invention, include electrolytic copper powders, reduced copper powders, atomized copper powders and copper powders obtained by mechanical pulverization, which may be in dendritic, acicular, spherical, flaky and/or granular forms. The copper powders used may generally have a $Cu(OH)_2$ and $Cu2O$. Use of a silver cyanide bath poses particle size lying in the range of from 0.5 to 20 μm.

Prior to using the copper powders, they may be pre-treated by reducing agents, dilute sulfuric acid washing, alkali degreasing and de-smutting. In this invention, however, these pre-treatments may be dispensed with.

Chelating Agent Solution

The chelating agents used in this invention form stable complexes with copper ions but, preferably, are less likely to react with silver ions. Used to this end, for instance, are ethylenediaminetetraacetate, triethylenediamine, diethylenetriaminepentaacetic acid, N,N,N',N'-tetra-ethylethylenediamine, diethylenediamine, phenanthroline, ethylenedioxybis(ethylamine)-N,N,N',N'-tetraacetic acid, nitrotriacetic acid and picolinic acid, which may be used alone or in combination. Of these chelating agents preference is given to ethylenediaminetetraacetate (hereinafter EDTA for short), triethylenediamine (Trien for short) and diethylenetriaminepentaacetic acid (DTPA for short), which may be used alone or in combination, because they form stable complexes with copper, are easily available and inexpensive, and excel in the ease with which they are handled. In the examples that follow, EDTA·2Na and 3Na were used as typical chelating agents.

In order to be used in this invention, the chelating agents are dissolved in suitable solvents, for instance, water. The purity of the water used may vary depending upon the performance of the silver-coated copper-based powders demanded. Preferably, use may be made of ion exchanged or pure water.

The preferable amount of the chelating agent used may be determined depending upon to what degree the copper powders used have been oxidized. Preferably, however, it is used in an amount of from 2 to 3 moles per mole of silver nitrate used in the form of a silver ion solution.

The chelating agent is used in two, usually equal, portions, a first portion thereof being added before the addition of the silver ion solution and a second portion thereof being added during the addition of the reducing agent, or in three, usually equal, portions, a first portion thereof being added before the addition of the silver ion solution, a second portion thereof being added during the addition of the reducing agent and a third portion thereof being added at the time of the completion of the reaction. This converts copper hydroxides and oxides on the surfaces of copper powders or an unstable copper/amine complex present in the liquid to be converted to a stable copper chelate complex, which makes it possible to provide a rapid and complete coating of silver onto the surfaces of copper powders and, at the same time, prevent the formation of copper hydroxides and oxides attributable to changes with time.

If required, the chelating agent solution may contain various additives including brighteners and dispersants for improving ductility and malleability such as lead chloride, potassium ferrocyanide and sodium laurate. As already mentioned, the chelating agent solution is in a weakly acidic to weakly alkaline state, in which copper forms a stable complex having a $[CuY]^{2-}$ (Y:EDTA) composition. This composition is unlikely to undergo hydrolysis, permit hydroxides to be formed on the surfaces of copper powders, and make silver ions form any complex.

Silver Ion Solution

The silver ion solution used in this invention may be an aqueous solution of silver nitrate or a weakly alkaline solution of silver ammonium. Usually, an ammonium-rich bath used for electroless plating gives rise to an ill-stable copper ammonium complex, which is then hydrolyzed during washing into copper hydroxides. In order to avoid this, the amount of the chelating agent used must be increased.

Although not critical in this invention, the concentration of the silver ion solution is adjusted to about 10 to 200 g/liter in view of the ease with which it is handled. The water used should preferably be ion exchanged or pure water.

Reducing Agent

For this invention various reducing agents may be used. Preferably, use is made of reducing agents having a reducing power so weak that at least complex ions of copper cannot be reduced thereby. In this connection, however, it is to be noted that silver coats are formed through substitution and deposition by the addition of silver ions, but a trace of silver ions present and by-products formed by that substitution reaction such as CuO, $Cu_2O$, AgO and $Ag_2O$ should all be reduced.

Such reducing agents include reducing organic compounds, e.g. carbohydrates like glucose and carboxylic acids like malonic, succinic, glycolic, lactic, malic, tartaric and oxalic acids and their salts. For instance, sodium potassium tartrate or Rochelle salt is preferably used.

The reducing agent serves well in the theoretical amount needed for reduction, although its amount may optionally vary depending upon the copper powders, chelating agent and silver ion solution used, the reaction conditions involved and other factors. The amount of the reducing agent used, for instance, lies in the range of from 0.1 to 10% by weight, preferably from 0.5 to 5% by weight, based on the weight of copper powders.

Production

One embodiment of the production of silver-coated copper-based powders according to this invention will now be explained, specifically but not exclusively, with reference to the flow chart of FIG. 1. As illustrated therein, the chelating agent is first dissolved in water to make a chelating agent solution. Then, copper powders are added to and dispersed in that solution to make a slurry. The silver ion solution is added to the resulting dispersion or slurry for promoting the substitution type of deposition reaction. Further, the reducing and chelating agents are added for promoting the reduction type of deposition reaction to reduce silver completely, thereby forming silver coats on the surfaces of the copper powders and, at the same time, converting by-products or unstable copper compounds into a stable copper chelate complex. If required, an additional amount of the chelating agent is added and stirred to deposit silver coats on the surfaces of the copper powders.

The conditions for the substitution and reduction types of deposition reactions—reaction time, temperature and pH, stirring conditions, etc.—may be optionally varied and chosen depending upon the types of the copper powders and reagents used and other factors. The addition of the silver ion solution to the copper dispersion, for instance, is desirously effected under agitation so as to accelerate the reactions involved.

After the deposition of silver ions by substitution and reduction, the silver-coated copper-based powders are washed, filtrated and dried. For washing, purified water may be sprayed over the silver-coated copper-based powders, or alternatively the silver-coated copper-based powders may be stirred in purified water. For drying, the silver-coated copper-based powders may be heated in normal ambient or inert atmospheres. Alternatively, they may be washed with a volatile liquid such as methanol, followed by the evaporation of that liquid.

The thus obtained silver-coated copper-based powders may have various applications, and may be used as electrically conductive fillers for electrically conductive paints, pastes and resins by way of example alone.

According to this invention, the silver-coated copper-based powders are prepared under the following actions.

Where the copper powders act upon the chelating agent solution, there is formed an extremely stable complex of the chelating agent with copper. This is true even when oxides, compounds (smuts) of organic materials with copper, etc. are present on the surfaces of the copper powders, because their bonds onto those surfaces are broken. Thus, it is possible to remove contaminants on the surfaces of the copper powders without leaving any trace of copper ions in the solution. The resulting silver-coated copper-based powders are so well-washable that the active points having the highest reactivity can be exposed on their surfaces. Acid washing and alkali washing, which have often been used in the art, are effective for washing bulky materials such as sheets or rods. In many cases, however, such washing techniques are said to be less effective for finely divided powders such as copper powders. This is because copper ions are so hydrolyzed during washing that not only are they readsorbed onto the copper powders' surfaces and reoxidized, but such impurities as alkali and acid ions are also likely to cause surface contamination. In accordance with the method of this invention which makes such treatments needless, however, it is possible to obtain clean copper surfaces with neither surface reoxidation nor surface contamination by impurity ions and so achieve uniform silver coating. This is a great advantage of the present invention.

As soon as the silver ion solution has been added to a slurry of copper powders activated on their surfaces, the substitution type of reaction occurs, forming silver coats on the copper powders' surfaces. This is because for one thing, the copper powders have been activated; for another, the silver ion solution used in this invention has been of low complex stability and hence in an unstable state. Moreover, since the pH region in which the substitution type of reaction occurs has been made weakly acidic or alkaline, it is very unlikely that Cu ions eluted by the substitution type of reaction may form unstable hydroxocomplexes like $[CuY(OH)]^{3-}$.

As described above, the silver coats are formed through the substitution type of deposition reaction caused by the addition of silver ions. However, the substitution type of reaction gives oxides and hydroxides as by-products which, in turn, may possibly degrade the oxidation resistance of the resulting silver-coated copper-based powders. In order to avoid this, the reducing and chelating agents are then added to the reaction system to reduce and precipitate silver ions and silver compounds, whereby copper compounds can be removed in the form of stable copper-chelates.

If required, the chelating agent is subsequently added to the reaction system in order to convert Cu ions adsorbed onto the silver coats and a copper/amine complex present therein to stable copper-chelates. By the above-mentioned treatments, the copper ions may be removed out of the system during the subsequent washing and filtration without undergoing hydrolysis.

In this invention, the deposition of silver is thus achieved through a combination of the substitution and reduction types of reactions, which enables intimate silver coats to be formed on the copper powders' surfaces, making it possible to produce silver-coated copper-based powders excellent in such properties as oxidation resistance, humidity resistance and stability with time.

The present invention has the following advantageous effects.

(a) It is possible to produce silver-coated copper-based powders which excel in humidity resistance and oxidation resistance, show stable properties without undergoing changes with time, and are of good electrical conductivity.

(b) Hitherto, copper powders have been subjected to pre-treatments, e.g. washing and degreasing. However, such pre-treatments are found to fail to produce their own effects, since hydroxides, oxides, etc. are formed on the copper powders' surfaces in the course of washing and filtration. According to this invention wherein the copper powders are treated with the chelating agent solution, however, it is possible to obtain copper powders activated on their surfaces with no particular need of such pre-treatments as washing. Accordingly, the entire process of this invention can be carried out with great ease, partially cutting production costs.

(c) The silver-coated copper-based powders of this invention place no critical limitation upon to what extent they have been coated with silver. Through the combination of the substitution type of deposition with the reduction type of deposition, it is possible to form intimate silver coats at a low to high coverage. For instance, no adverse influence is produced on properties even at a 1% coverage. This is because the copper powders are so cleaned on their surfaces by the chelating agent that their active surface regions can be uniformly coated with silver. Thus, a reduction in silver coverages has no adverse influence on properties whatsoever.

(d) Conventional methods (for instance, those disclosed in Japanese Patent Kokai Publication No. Sho. 61-3802 and Japanese Patent Publication No. Sho. 57-59283) are not only uneconomical—because increased amounts of ammonium salt and chelating agents are used, but are also low in terms of yield—because the copper powders themselves have been dissolved in the reaction solution. The method of this invention, however, is very economical and so of great industrial value, because the amounts of the reagents used, all expensive, can be substantially reduced.

(e) Conventionally produced, silver-coated copper-based powders have non-uniform silver coats. Besides, they must be stored in an inert atmosphere such as a nitrogen atmosphere in order to maintain their initial properties, because unstable copper and silver compounds and impurity elements still remain. By contrast, the silver-coated copper-based powders according to this invention can be stored even under unfavorable conditions like high-temperature and -humidity conditions without suffering changes in properties.

(f) According to the method of this invention wherein the chelating agent is added to the reaction system in two or three portions for the purpose of achieving different functions of providing separate removal of surface oxides, by-products formed by the substitution type of reaction, ion deposits, etc., it is possible to obtain uniform silver coats which are unlikely to include oxides or deficiencies therein, as often experienced in conventional processes wherein a batch of chelating agents is added at the same time to silver ion solutions to form silver-chelate complexes so as to immobilize copper ions secondarily produced by the substitution type of reaction in the form of complexes.

EXAMPLES

The present invention will now be explained more specifically but not exclusively with reference to the following examples.

EXAMPLE 1

First, 496.5 g of copper powders (atomized copper powders having a mean particle size of 8 μm) were dispersed in a chelating agent solution obtained by dissolving 15 g of EDTA·2Na (dihydrate) in 4 liters of pure water, and the dispersion was stirred at 200 rpm for 10 minutes with the use of a stirrer to remove surface oxides and smuts (at a solution temperature of 40° C., pH 4.67 and a Cu ion concentration of 0.13 g/liter). Under agitation, a silver ion solution prepared by adding 21 ml of aqueous ammonia (25%) to 180 ml of pure water containing 15.7 g of silver nitrate was added to the copper powders dispersion, and stirring was continued for a further about 30 minutes to effect the substitution and deposition of silver (at a solution temperature of 40° C., pH 9.01 and a Cu ion concentration of 0.67 g/liter). Subsequently, 13 g of Rochelle salt and 15 g of EDTA·2Na were added under agitation to the reaction system, and stirring was continued for a further about 15 minutes to reduce and remove by-products or oxides formed through the substitution type of reaction and to precipitate silver ions completely (at pH 8.64 and a Cu ion concentration of 0.79 g/liter). Further, 15 g of EDTA·2Na were added to the reaction solution to stabilize the Cu ions and amine complex adsorbed onto the powders in the form of copper chelates (at pH 8.38 and a Cu ion concentration of 0.81 g/liter). Then, the solution was filtered, and the product was washed with pure water until filtrates become transparent, followed by drying at 70° C. in the air. The resulting silver-coated copper-based powders weighed 482 g and had a silver content of 2.04%. The powders were also found to have a specific surface area of 0.29 m$^2$/g, a tap density of 3.64 g/cc and a silver coverage of 91%, as determined by ESCA (photoelectronic spectroscopy).

Fifty (50) g of the resulting silver-coated copper-based powders, together with 11.26 g of a phenolic resin-based solution having the following composition, were milled thirty times with a three-roll mill to prepare a past, which was in turn coated on a paper-phenol substrate by screen printing. This substrate was dried at 160° C. for 30 minutes into a circuit board.

Phenolic Resin-Based Solution composed of, in weight %:

| | |
|---|---|
| Phenolic resin | 49.4 |
| Methyl Carbitol | 37.3 |
| Toluene | 4.5 |
| Acetone | 8.8 |

The coat showed a very excellent electrical conductivity, as expressed in terms of a specific resistance value of $1.59 \times 10^{-4}$ Ω cm.

After soldering, this coat was found to have a 90° C. pull strength of 1.37 kg/mm$^2$, as measured.

In order to estimate the humidity resistance and oxidation resistance of the obtained silver-coated copper-based powders, 100 g of powders were stored in an air-conditioning equipment maintained at 40° C. and a 95% relative humidity for 24 hours. Thereafter, the powders were formed into a paste according to the above-mentioned procedure, and the resulting paste was found to have a specific resistance value of $1.61 \times 10^{-4}$ Ω cm. In other words, the change in specific resistance value was 1.3%. Additional estimation was made of the resistance change, heat resistance and humidity resistance at high temperature of the coat. as a result, all these properties showed little or no sign of degradation.

The results are reported in Table 1.

EXAMPLE 2

First, 496.5 g of copper powders (atomized copper powders having a mean particle size of 8 μm) were dispersed in a chelating agent solution obtained by dissolving 15 g of EDTA·2Na (dihydrate) in 4 liters of pure water, and the dispersion was stirred at 200 rpm for 10 minutes with the use of a stirrer to remove surface oxides and smuts (at a solution temperature of 40° C., pH 4.61 and a Cu ion concentration of 0.13 g/liter). Under agitation, a silver ion solution prepared by dissolving 7.85 g of silver nitrate in 100 ml of pure water, and stirring was continued for a further about 30 minutes to effect the substitution and deposition of silver (at a solution temperature of 40° C., pH 2.74 and a Cu ion concentration of 0.43 g/liter). Subsequently, 13 g of Rochelle salt and 15 g of EDTA·2Na were added under agitation to the reaction solution, and stirring was continued for a further about 15 minutes to reduce and remove the by-products or oxides formed through the substitution type of reaction and to precipitate silver ions completely (at pH 3.42 and a Cu ion concentration of 0.64 g/liter). Further, 15 g of EDTA·2Na were added to the reaction solution to stabilize the Cu ions and amine complex adsorbed onto the powders in the form of copper chelates (at pH 3.42 and a Cu ion concentration of 0.47 g/liter). Then, the solution was filtrated, and the product was washed with pure water until filtrates become transparent, followed by drying at 70° C. in the air. The obtained silver-coated copper-based powders weighed 476 g and had a silver content of 1.01%. The powders were also found to have a specific surface area of 0.33 m$^2$/g, a tap density of 3.45 g/cc and a silver coverage of 92 %, as determined by ESCA (photoelectronic spectroscopy).

With similar procedures as in Example 1, the obtained powders were formed into a paste. Then, the paste was used to form a coat, the properties of which were in turn determined. The results are reported in Table 1, from which it is understood that only a 1% silver content gives satisfactory properties.

EXAMPLES 3 TO 5

The procedures of Example 1 were followed with the exception that the type of copper powders, the type, amount and number of addition of chelating agents used, the type of silver ion solutions, the amount of silver coated and the amount of Rochelle salt added were varied. In Example 3, the chelating agent was added to the reaction solution in two portions, the first portion thereof being added before the addition of the silver ion solution and the second portion thereof being added during the addition of the reducing agent. In Examples 4 and 5, the 3rd portion of the chelating agent was further added at the time of the completion of the reaction. It is noted that the chelating agents mentioned in Table 1 are all the total of the 1st and 2nd or plus 3rd portions. With similar procedures as in Example 1, the obtained powders were formed into pastes. Then, the pastes were used to form coats, the properties of which were similarly determined. The conditions and results are reported in Table 1. From the results set out in Table 1, it is seen that the silver-coated copper-based powders obtained according to this invention are excellent in humidity resistance and oxidation resistance and are unlikely to suffer changes with time.

COMPARATIVE EXAMPLE 1

Silver-coated copper-based powders were produced according to one of the conventional processes (disclosed in Japanese Patent Publication No. Sho.

57-59283). That is, 500 g of copper powders (atomized copper powders having an average particle size of 8 μm) were added to 500 cc of an aqueous solution of sulfuric acid prepared by diluting 25 g of concentrated sulfuric acid with pure water. The solution was stirred at room temperature for 10 minutes, followed by repeated washing with warm water (30° C.) until filtrates reached neutrality.

Then, the thus obtained, wet copper powders were transferred into a 5-liter beaker, to which a silver complex salt solution having the following composition was added. Stirring was continued at a solution temperature of 25° C. and a stirring speed of 200 rpm for 60 minutes to effect the substitution and deposition of silver, thereby obtaining silver-coated copper-based powders. The powders were repeatedly washed with warm water at 30° C. until filtrates became colorless. Subsequent filtration and drying at 70° C. yielded 497 g of silver-coated copper-based powders having a silver content of 2.04%. The powders were also found to have a specific surface area of 0.33 m$^2$/g, a tap density of 3.64 g/cc and a silver coverage of 85%, as measured by ESCA. This silver coverage is significantly poor.

With similar procedures as in Example 1, the obtained powders were formed into a paste. Then, the paste was used to form a coat, the properties of which were similarly measured. The results are reported in Table 2, which indicates that such a coat has had good initial specific resistance value, but it has suffered large changes with time and been inferior in humidity resistance and oxidation resistance.

Bath Composition

| Composition of Liquid A | |
|---|---|
| Silver nitrate | 16.24 g |
| Pure water | 32 cc |
| Composition of Liquid B | |
| Ammonium Carbonate | 81.2 g |
| EDTA · 2Na | 65 g |
| Pure water | 2 liters |

COMPARATIVE EXAMPLE 2

Silver-coated copper-based powders were prepared according to the conventional process (disclosed in Japanese Patent Kokai Publication No. Sho. 61-3802).

Five hundred (500) g of copper powders (atomized copper powders having a mean particle size of 8 μm), which had been degreased with an alkaline aqueous solution and treated with dilute sulfuric acid to remove oxide films, were added to and dispersed in 2 liters of pure water by stirring at 400 rpm. Then, a total of 2.5 liters of a silver complex salt solution was prepared by dissolving 15.19 g of silver nitrate and 101.2 g of EDTA·2Na salt in 2 liters of pure water and adding 147 ml of aqueous ammonia to the solution. This silver complex salt solution was added to the copper powder dispersion over 5 minutes, while stirring was performed at 400 rpm, for a 1-hour reaction. Then, the solution was filtrated, and the product was washed with pure water until filtrates reached pH 7. Subsequent vacuum drying at 50° C. yielded 485 g of silver-coated copper-based powders having a silver content of 2.01%, a specific surface area of 0.29 m$^2$/g and a tap density of 3.57 g/cc. The powders were also 86% in terms of silver coverage, as determined by ESCA, the figure indicating that they have not been uniformly coated with silver.

With similar procedures as in Example 1, the properties of the obtained silver-coated copper-based powders were measured. The results are reported in Table 2, which indicates that the product is generally better than that of Comparative Ex. 1, but it has suffered large changes with time and been inferior in oxidation resistance and humidity resistance in particular.

COMPARATIVE EXAMPLE 3

With the exception that no reducing agent was used, the procedures of Example 1 were followed to obtain 481 g of silver-coated copper-based powders having a silver content of 2.08%, a specific surface area of 0.28 m$^2$/g and a tap density of 3.70 g/cc. Also, the powders were 91% in terms of silver coverage, as determined by ESCA. With similar procedures as in Ex. 1, the properties of the silver-coated copper-based powders were measured. The results are reported in Table 2, which indicates that the silver-coated copper-based powders and a coat obtained therefrom have been slightly inferior in aging resistance.

COMPARATIVE EXAMPLE 4

With the exception that a batch of EDTA·2Na was initially inputted in an undivided fashion, the procedures of Ex. 1 were followed to obtain 487 g of silver-coated copper-based powders having a silver content of 2.01%, a specific surface area of 0.28 m$^2$/g, a tap density of 3.60 g/cc and an ESCA silver coverage of 92%. The properties of the obtained silver-coated copper-based powders were measured by similar procedures as in Ex. 1. The results are reported in Table 2, which indicates that the humidity resistance of the powders and the aging resistance of the coat obtained therefrom have both been inferior.

COMPARATIVE EXAMPLE 5

With the exception that aqueous ammonia was used in excess, the procedures of Ex. 1 were followed to obtain 465 g of silver-coated copper-based powders having a silver content of 1.98%, a specific surface area of 0.27 m$^2$/g, a tap density of 3.88 g/cc and an ESCA silver coverage of 81%. The properties of the obtained silver-coated copper-based powders were measured with similar procedures as in Ex. 1. The results are reported in Table 2, which indicates that the humidity resistance of the powders and the aging resistance of the coat obtained therefrom have both been inferior. It is also understood that use of excessive ammonia has resulted in a considerable drop of the silver coverage on the copper powders' surfaces.

TABLE 1

| | Examples | | | | |
|---|---|---|---|---|---|
| | 1 | 2 | 3 | 4 | 5 |
| Type of Copper Powders | 8-μm atomized powders | | | 2-μm reduced copper powders | |
| Silver Nitrate (g) | 15.7 | 7.85 | 15.7 | 15.7 | 15.7 |
| EDTA · 2Na (g) | 45.0 | 45.0 | 30.0 | 0 | 75.0 |
| EDTA · 3Na (g) | 0 | 0 | 0 | 45.0 | 0 |
| Aqueous ammonia (25%) (ml) | 21.0 | 0 | 0 | 0 | 21.0 |
| Rochelle salt (g) | 13.0 | 5.0 | 13.0 | 5.0 | 13.0 |
| Powder properties | | | | | |
| Ag grade (%) | 2.04 | 1.01 | 2.01 | 2.01 | 1.96 |
| Silver coverage A (%) | 91 | 92 | 92 | 92 | 91 |
| Specific surface area (m$^2$/g) | 0.25 | 0.33 | 0.38 | 0.47 | 0.51 |
| Tap density (g/CC) | 3.81 | 3.45 | 4.26 | 3.39 | 4.08 |

TABLE 1-continued

|  | Examples | | | | |
| --- | --- | --- | --- | --- | --- |
|  | 1 | 2 | 3 | 4 | 5 |
| Initial specific resistance value of coat ($\times 10^{-4} \Omega \cdot cm$) | 1.59 | 2.01 | 1.94 | 2.86 | 2.89 |
| Bond strength (kg/mm$^2$) | 1.37 | 1.21 | 1.29 | 0.98 | 1.00 |
| Powder humidity resistance B | | | | | |
| Specific resistance value ($\times 10^{-4} \Omega \cdot cm$) | 1.61 | 1.89 | 1.93 | 3.52 | 2.54 |
| Resistance change C (%) | 1.3 | −6.0 | −0.5 | 19.0 | −9.9 |
| Heat resistance-resistance change of coat | | | | | |
| 85° C. 100 hr C (%) | 1.1 | 2.6 | 0 | 0 | 0 |
| 150° C. 100 hr C (%) | −2.3 | 14.5 | 11.2 | 13.0 | 2.9 |
| Humidity resistance-resistance change of coat | | | | | |
| 85° C., 95% RH 50 hr C (%) | 13.7 | 10.1 | 17.7 | 15.0 | 16.0 |
| 85° C., 95% RH 100 hr C (%) | 21.2 | 15.1 | 27.6 | 22.0 | 20.8 |

A: Determined by ESCA
B: Value measured with silver-coated copper-based powders made into a paste after they had been placed in a shallow vessel stored in an air-conditioning equipment maintained at 40° C. and a 95% relative humidity.
C: Found by the equation: Change ($\Delta R/R \times 100\%$) = (specific resistance value after aging − initial specific resistance value)/(initial specific resistance value) $\times$ 100%

TABLE 2

|  | Comparative Examples | | | | |
| --- | --- | --- | --- | --- | --- |
|  | 1 | 2 | 3 | 4 | 5 |
| Type of Copper Powders | Average 8-μm atomized powders | | | | |
| Silver Nitrate (g) | 16.24 | 15.19 | 15.7 | 15.7 | 15.7 |
| EDTA · 2Na (g) | 0 | 101.2 | 45.0 | 45.0 | 45.0 |
| EDTA · 3Na (g) | 65 | 0 | 0 | 0 | 0 |
| Aqueous ammonia (25%) (ml) | 0 | 147 | 21.0 | 0 | 147.0 |
| Rochelle salt (g) | 0 | 0 | 0 | 13.0 | 13.0 |
| Ammonium carbonate (g) | 81.2 | 0 | 0 | 0 | 0 |
| Powder properties | | | | | |
| Ag grade (%) | 2.04 | 2.01 | 2.08 | 2.02 | 1.98 |
| Silver coverage A (%) | 85 | 86 | 91 | 92 | 81 |
| Specific surface area (m$^2$/g) | 0.33 | 0.29 | 0.28 | 0.28 | 0.27 |
| Tap density (g/CC) | 3.64 | 3.57 | 3.70 | 3.60 | 3.88 |
| Initial specific resistance value of coat ($\times 10^{-4} \Omega \cdot cm$) | 2.81 | 2.20 | 3.40 | 2.20 | 2.21 |
| Bond strength (kg/mm$^2$) | 0.93 | 0.90 | 0.90 | 0.98 | 1.06 |
| Powder humidity resistance B | | | | | |
| Specific resistance value ($\times 10^{-4} \Omega \cdot cm$) | 21.80 | 6.61 | 4.49 | 6.47 | 6.31 |
| Resistance change C (%) | 673 | 213 | 31 | 201 | 188 |
| Heat resistance-resistance change of coat | | | | | |
| 85° C. 100 hr C (%) | 0 | 1.1 | −0.6 | 1.2 | 0 |
| 150° C. 100 hr C (%) | 4.4 | 7.0 | 2.2 | 0 | 1.1 |
| Humidity resistance-resistance change of coat | | | | | |
| 85° C., 95% RH 50 hr C (%) | 36.4 | 30.0 | 44.7 | 30' | 21.5 |
| 85° C., 95% RH 100 hr C (%) | 473 | 40.0 | 58.7 | 41.3 | 30.1 |

For A, B and C, see Table 1.

As can be seen from the results set out in Tables 1 and 2, the silver-coated copper-based powders obtained according to the method of this invention have much improved humidity resistance and oxidation resistance, and can always exert the same performance as produced, with no need of taking special storage means. The coats formed using such powders have excellent humidity resistance and heat resistance, are much less likely to undergo changes with time, and are of improved bond strength.

By contrast, the powders obtained in the comparative examples are seriously inferior in humidity resistance and oxidation resistance, posing a storage problem. Moreover, in Comparative Examples 1, 2 and 5, the silver contents are so low that problems arise in connection with coat uniformity. In Comparative Example 3 wherein no reducing agent is used, coat humidity resistance poses problems.

Thus, in cases where, unlike the present invention wherein the chelating agent is used in two or three portions so as to achieve different functions, that chelating agent is added all together or added at the same time to the silver ion solution, aqueous ammonia is used in excess, or no reducing agent is used at all, the resulting silver-coated copper-based powders per se and coats obtained therefrom undergo so large changes with time that when used as electrically conductive fillers, they do not serve well.

What is claimed is:

1. A method of producing silver-coated copper-based powders comprising the steps of:
   a) dispersing copper powders in a weakly alkaline to weakly acidic chelating agent solution,
   b) adding a silver ion solution to the dispersion of step a) to effect a substitution deposition reaction,
   c) adding a reducing agent and said chelating agent solution tot he resulting solution of step b) to effect a reduction deposition reaction, thereby forming silver coats on the surfaces of said copper powders, and
   d) optionally further adding said chelating agent solution to the solution of step c) after completion of the reduction deposition reaction.

2. The method as claimed in claim 1, wherein said chelating agent is selected from the group consisting of ethylenediaminetetraacetate, triethylenediamine, diethylenetriaminepentaacetic acid, N,N,N',N'-tetraethylethylenediamine, diethylenediamine, phenanthroline, ehtylenedioxybis(ethylamine)-N,N,N',N'-tetraacetic acid, nitrotriacetic acid and picolinic acid, which may be used alone or in combination.

3. The method as claimed in claim 1, wherein said copper powders are selected from the group consisting of electrolytic copper powders, reduced copper powders, mechanically pulverized copper powders and mixtures thereof.

4. The method as claimed in claim 1, wherein said copper powders are of a size lying in the range of 0.5 to 20 μm.

5. The method as claimed in claim 1, wherein said silver ion solution is selected from the group consisting of an aqueous solution of silver nitrate and weakly alkaline aqueous solution of silver ammonium.

6. The method as claimed in claim 1, wherein said reducing agent is selected from the group consisting of a carbohydrate, a carboxylic acid and a carboxylate.

7. The method as claimed in claim 1, wherein the amount of said reducing agent used lies in the range of 0.1 to 10% by weight based on said copper powders.

8. The method as claimed in claim 6, wherein said carboxylate is glucose.

9. The method as claimed in claim 6, wherein said carboxylic acid is selected from the group consisting of malomic, succinic, glycolic, lactic, malic, tartaric and oxalic acids.

10. The method as claimed in claim 6, wherein said carboxylate is sodium potassium tartarate.

* * * * *